United States Patent
Benson et al.

(10) Patent No.: US 6,663,335 B2
(45) Date of Patent: Dec. 16, 2003

(54) PULL SHEET FOR UNLOADING LOADS FROM A CONTAINER

(75) Inventors: Robert H. Benson, Shawnee, KS (US); John A. Gentle, Toledo, OH (US); Robert J. Jeffries, Kansas City, MO (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 292 days.

(21) Appl. No.: 09/829,754

(22) Filed: Apr. 10, 2001

(65) Prior Publication Data

US 2002/0146307 A1 Oct. 10, 2002

(51) Int. Cl.7 .............................................. B65G 67/24
(52) U.S. Cl. ...................................... 414/395; 414/809
(58) Field of Search ................................ 414/373, 395, 414/400, 527, 585, 809

(56) References Cited

U.S. PATENT DOCUMENTS

| | | | |
|---|---|---|---|
| 939,758 A | * 11/1909 | Tillery | 414/514 |
| 3,998,343 A | 12/1976 | Fors | |
| 4,467,004 A | 8/1984 | Liebel | |
| 4,749,325 A | 6/1988 | Hodgetts | |
| 4,799,607 A | * 1/1989 | Podd | 105/279 |
| 4,816,316 A | * 3/1989 | Robbins, III | 428/161 |
| 4,842,471 A | 6/1989 | Hodgetts | |
| 4,892,456 A | * 1/1990 | Hodgetts | 198/499 |
| 5,046,690 A | * 9/1991 | Nordstrom | 198/750.1 |
| 5,145,728 A | * 9/1992 | Itaba et al. | 428/213 |
| 5,163,801 A | * 11/1992 | Nordstrom | 244/137.1 |
| 5,340,266 A | * 8/1994 | Hodgetts | 414/527 |
| 5,395,204 A | 3/1995 | Balik | |
| 5,570,643 A | * 11/1996 | Werner | 108/51.11 |
| 5,653,572 A | * 8/1997 | Podd et al. | 414/527 |
| 5,862,650 A | 1/1999 | Adams et al. | |
| 5,894,804 A | * 4/1999 | Werner | 108/53.5 |
| 5,902,090 A | * 5/1999 | Young et al. | 198/570 |
| 5,934,725 A | 8/1999 | Bowers | |
| 6,003,581 A | * 12/1999 | Aihara | 156/555 |

FOREIGN PATENT DOCUMENTS

JP 11-77867 * 3/1999

* cited by examiner

Primary Examiner—James W. Keenan
(74) Attorney, Agent, or Firm—Inger H. Eckert; Stephen W. Barns; Maria C. Gasaway

(57) ABSTRACT

Apparatus for unloading a load from a container having a floor, includes a floor sheet placed on the floor of the container, the floor sheet having a top surface with a coefficient of static friction less than about 0.3. A pull sheet placed on the top surface of the floor sheet, the pull sheet having a bottom surface with a coefficient of static friction less than about 0.5. The pull sheet has a tensile strength sufficient to enable the pull sheet to be pulled from the container while maintaining the load on the top surface of the pull sheet to unload the load from the container.

18 Claims, 3 Drawing Sheets

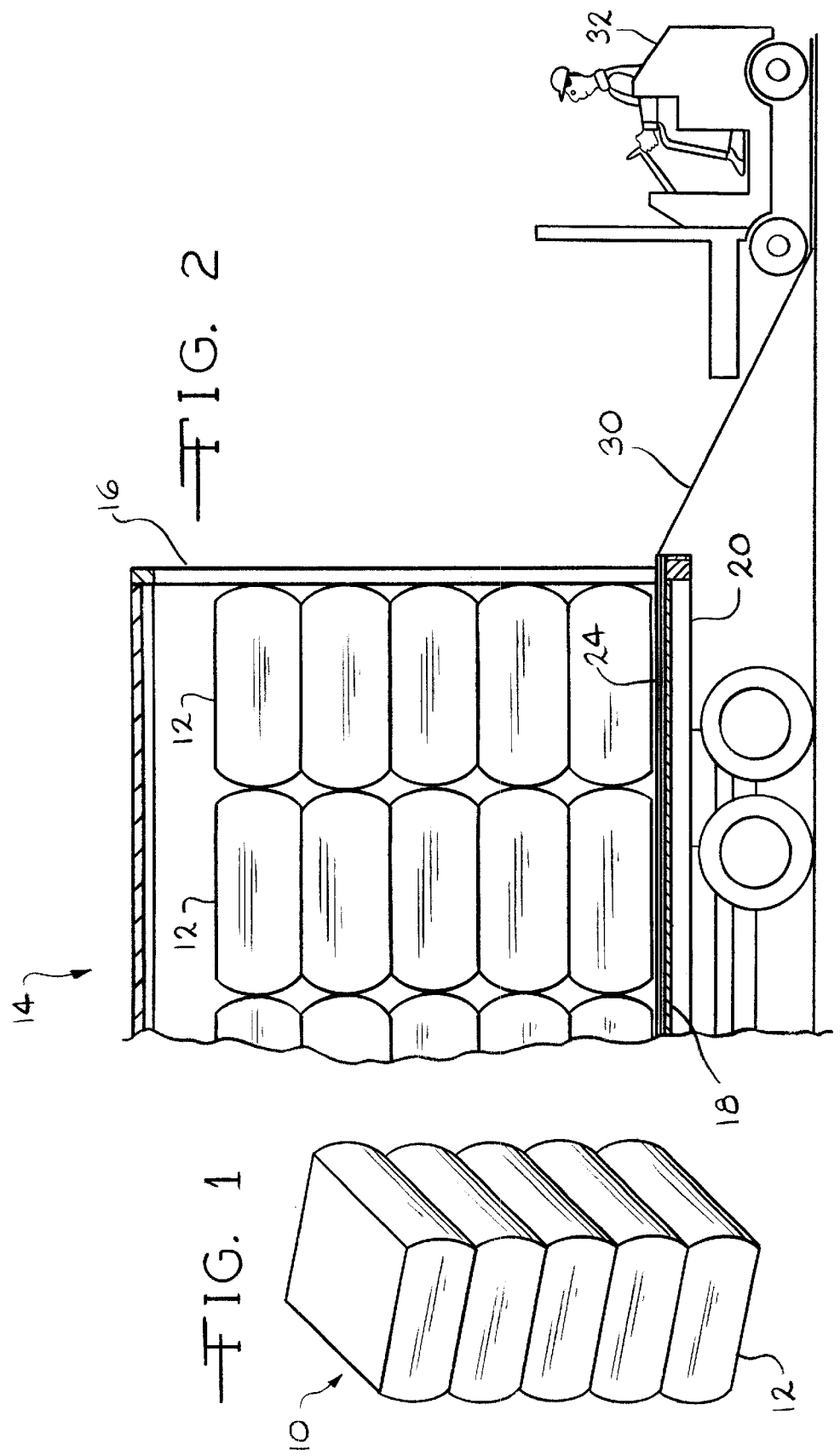

PULL SHEET FOR UNLOADING LOADS FROM A CONTAINER

TECHNICAL FIELD

This invention relates to an unloading device for shipping containers, such as trucks. More particularly, this invention relates to an apparatus for pulling a load from a container.

BACKGROUND OF THE INVENTION

The transportation and storage of large or heavy objects is carried out in many instances by loading the objects in a truck or storage container. Fiberglass insulation batts, for example, are highly compressed and packaged in large packages for shipping from a manufacturing facility to a distribution or storage location or to a site of installation. These large, heavy packages are often bulky and present difficulties in loading and unloading the truck or storage container. To load the storage container, the packages are placed side by side in the container, and multiple rows and tiers of the packages are placed within the container, filling it with as little as one row, or tier, up to a full container load. A half load of such insulation material may weigh as much as 10,000 pounds.

The unloading of this material is accomplished by a variety of methods, including manual unloading, and unloading with the aid of a mechanical lifting device, such as a forklift. The material can be unloaded at a location with a loading dock. However, unloading is often necessary at locations that are not equipped with a loading dock. Conventional unloading practices usually involve removing one package at a time until the container is unloaded. This method is both time-consuming and requires a tremendous amount of physical effort by the person unloading the container. As more and more of the load is removed from the container, it is necessary to move each row of material to the end of the container before finally removing the material from the container. This movement of the material within the container is often referred to as tailgating. Manual unloading of the material in the container on a piece-by-piece basis is costly, and the additional physical effort by the unloader during the tailgating movement of the packages further increases the labor cost, thus resulting in increased shipping costs. An additional known method for unloading a shipping container includes the use of a rolling floor and push plate mechanism, as evidenced by U.S. Pat. No. 5,395,204 to Balik. Another known method for unloading a load from a container involves the use of a conveyor belt contained within the trailer, in combination with a rolling floor and pushing mechanism, as evidenced by U.S. Pat. No. 3,998,343 to Fors. It is also known to use a trailer-contained conveyor system in conjunction with a bulkhead which moves beyond the back opening of the trailer, as evidenced by U.S. Pat. No. 4,842,471 to Hodgetts. While all of these additional methods reduce physical effort and unloading time, all require specially equipped shipping containers, thus substantially increasing shipping costs by requiring specialized equipment.

It is known to use a sheet or belt laid over the bed or floor of the storage container in conjunction with a conveyor system to remove a load from a container, as evidenced by U.S. Pat. No. 4,749,325 to Hodgetts. The method suggested by this patent includes pulling the load from the container by pulling a sheet laid over the bed of the container along the conveyor mechanism and winding this sheet around a mandrel to pull the sheet and the load out of the container.

It would be advantageous if a method could be developed to increase the ease with which a load of various materials could be effectively removed from a truck or other container without requiring time-consuming physical unloading of the container and without requiring the use of costly customized unloading equipment.

SUMMARY OF THE INVENTION

The above objects as well as other objects not specifically enumerated are achieved by an apparatus for unloading a load from a container having a floor, where the apparatus includes a floor sheet placed on the floor of the container, the floor sheet having a top surface with a coefficient of static friction less than about 0.3. A pull sheet is placed on the top surface of the floor sheet, the pull sheet having a bottom surface with a coefficient of static friction less than about 0.5. The pull sheet has a tensile strength sufficient to enable the pull sheet to be pulled from the container while maintaining the load on the top surface of the pull sheet to unload the load from the container.

According to this invention, there is also provided a method of unloading a load from a container having a floor, including positioning a floor sheet on the floor of the container, the floor sheet having a top surface with a coefficient of static friction less than about 0.3. A pull sheet is positioned on the top surface of the floor sheet, the pull sheet having a bottom surface with a coefficient of static friction less than about 0.5. A load is placed on a top surface of the pull sheet. The pull sheet is pulled from the container while maintaining the load on the top surface of the pull sheet to unload the load from the container.

According to this invention there is also provided a method of unloading a load from a container having a floor, including positioning a floor sheet on the floor of the container, the floor sheet having a top surface with a coefficient of static friction less than about 0.3. A pull sheet is positioned on the top surface of the floor sheet, the pull sheet having a load portion and an extension portion, the load portion having a bottom surface with a coefficient of static friction less than about 0.5 and being adapted to receive the load, and the extension portion being adapted to extend away from the load portion for pulling the pull sheet from the container. A load is placed on a top surface of the pull sheet, and the extension portion is extended. The pull sheet is pulled from the container by pulling the extension portion relative to the container while maintaining the load on the top surface of the pull sheet to unload the load from the container.

According to this invention, there is also provided a method of unloading a load from a container having a floor, the container having a rearward end and the load having a forward end in a direction opposite the direction of the rearward end of the container. The method includes positioning a floor sheet on the floor of the container, the floor sheet having a top surface with a coefficient of static friction less than about 0.3. A pull sheet is positioned on the top surface of the floor sheet. The load is positioned on the pull sheet. The load is unloaded from the container by applying a rearwardly directed force to the forward end of the load.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is a schematic view of a package of bags of insulation batts.

FIG. 2 is a cross-sectional view in elevation of a truck containing a plurality of the packages.

DETAILED DESCRIPTION OF THE INVENTION

Figure 3:
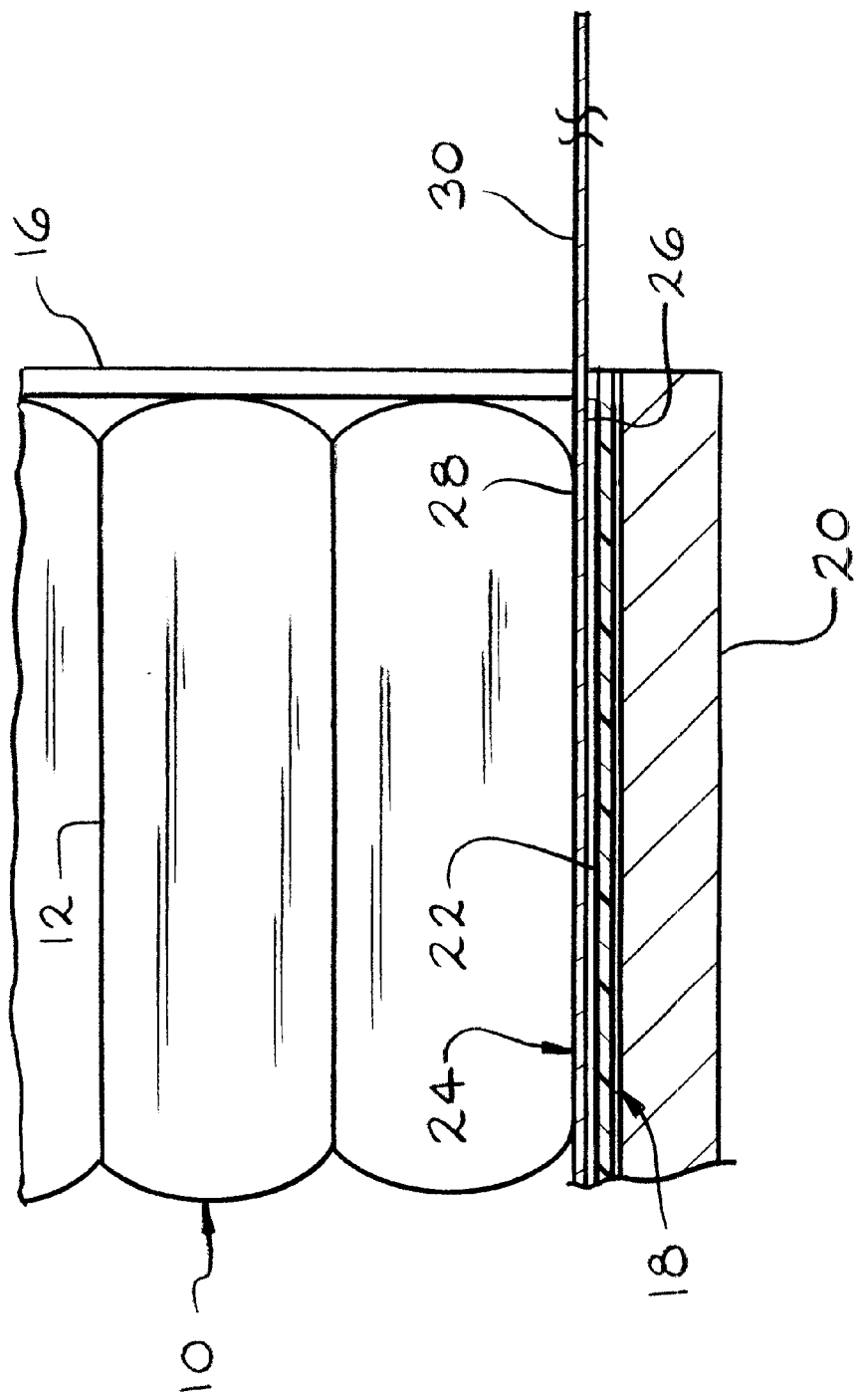
FIG. 3 is a detailed view of a portion of the floor of the truck and a portion of a package.

As shown in FIG. 1, insulation material is packaged in a plurality of bags 10, which contain insulation material. While the invention will be described in conjunction with bags or packages of fiberglass insulation material being unloaded from a truck, it is to be understood that the load in the truck can comprise other material, such as other construction materials (foam insulation products, pipe insulation products, and the like) as well as non-construction materials. The bags of insulation are stacked on top of each other and bound together as a package 12 by a band of stretch material or by a sleeve, neither of which is shown. The stretch material (or sleeve) enables the entire package 12 to be picked up as a unit by a forklift truck. Also, the package can be maneuvered by a worker using an end over end technique. The stretch material and the bags are typically made of a plastic film material. Where a sleeve is used, the sleeve is typically a woven polypropylene material.

As shown in FIG. 2, a plurality of packages 12 are placed inside a container, such as truck 14. It is to be understood that for purposes of the invention the container can be any kind of container that contains packages. Other examples include railcars and storage containers. The packages are typically placed in rows and/or columns, extending from the front of the truck, not shown in FIG. 2, to the rear 16 of the truck.

As shown in FIGS. 2 and 3, there is a floor sheet 18 arranged on the floor 20 of the truck 14. The purpose of the floor sheet 18 is to provide a low friction surface to ease the unloading of a load from the truck 14. The floor sheet 18 has a top surface 22 with a suitably low coefficient of static friction, preferably less than about 0.3. More preferably, the coefficient of static friction on the top surface 22 of the floor sheet 18 is less than about 0.15. One suitable floor sheet 18 is composed of a monolayer of polyethylene, comprised of both linear low density polyethylene and high density polyethylene. It is to be understood that for purposes of the invention the floor sheet 18 can be composed of any type of or combination of material which satisfies the required frictional characteristic, i.e., having a coefficient of static friction less than about 0.3.

Positioned on top of the floor sheet 18 is a pull sheet 24. The purpose of the pull sheet 24 is to enable the load of packages 12 to be pulled from the truck 14. For this reason, the pull sheet has a low friction bottom surface 26 for sliding on the top surface 22 of the floor sheet 18. The coefficient of static friction for the bottom surface 26 of the pull sheet 24 is preferably less than about 0.5. More preferably, the coefficient of static friction on the bottom surface 26 of the pull sheet 24 is less than about 0.4. The pull sheet 24 also has a top surface 28 that comes in contact with a load of packages 12. The coefficient of static friction for the top surface 28 of the pull sheet 24 is preferably greater than about 0.6, and more preferably at least about 0.7.

Since proper operation of the pull sheet 24 involves having the pull sheet slip or slide along the floor of the truck while carrying a heavy load, it is important that the pull sheet not catch or bind on the floor of the truck. Therefore, another purpose of the floor sheet 18 is to provide protection for the pull sheet against any possible roughness of or obstructions on the truck floor 20. By shielding the pull sheet from damage by the truck floor 20, the floor sheet helps ensure successful removal of the contents of the truck.

The pull sheet 24 may be formed of a woven mat of tape or strips of polypropylene film. It is to be understood that the pull sheet can have many different types of structures. For example, the pull sheet can be a nonwoven mat. Also, the pull sheet 24 can be a composite of different layers. Other materials besides polypropylene can be used. The bottom surface 26 of the pull sheet 24 is preferably coated with polypropylene to achieve the required low coefficient of static friction. Other low-friction surfacing materials can be used. It is to be understood that for purposes of the invention, the pull sheet 24 can be composed of any type or combination of material which satisfies the required frictional characteristics and which has sufficient tensile strength to withstand the tensile forces during the unloading process.

In a preferred embodiment of the invention, the pull sheet 24 has an extension portion 30, and this is to be used to pull the pull sheet 24 and the load of packages 12 out of the truck 14. There are two methods for using the pull sheet 24 to pull out the load of packages 12. As shown in FIG. 2, the packages 12 can be removed from the truck 14 by fixing the extension portion 30 to an immovable object (as shown in FIG. 2) and moving the truck 14 to unload the load from the truck. By positioning a forklift truck 32 on top of the extension portion 30, the extension portion 30 becomes fixed with respect to the ground, and movement of the truck 14 will draw the pull sheet 24, and the load resting on the pull sheet, out of the truck 14. The low coefficients of friction of the bottom surface 26 of the pull sheet 24 and the top surface 22 of the floor sheet 18 facilitate the sliding of the pull sheet 24 along the floor sheet 18. The relatively high coefficient of friction of the top surface 28 of the pull sheet 24 causes the packages to remain on the pull sheet for unloading the load from the truck.

Figure 4:
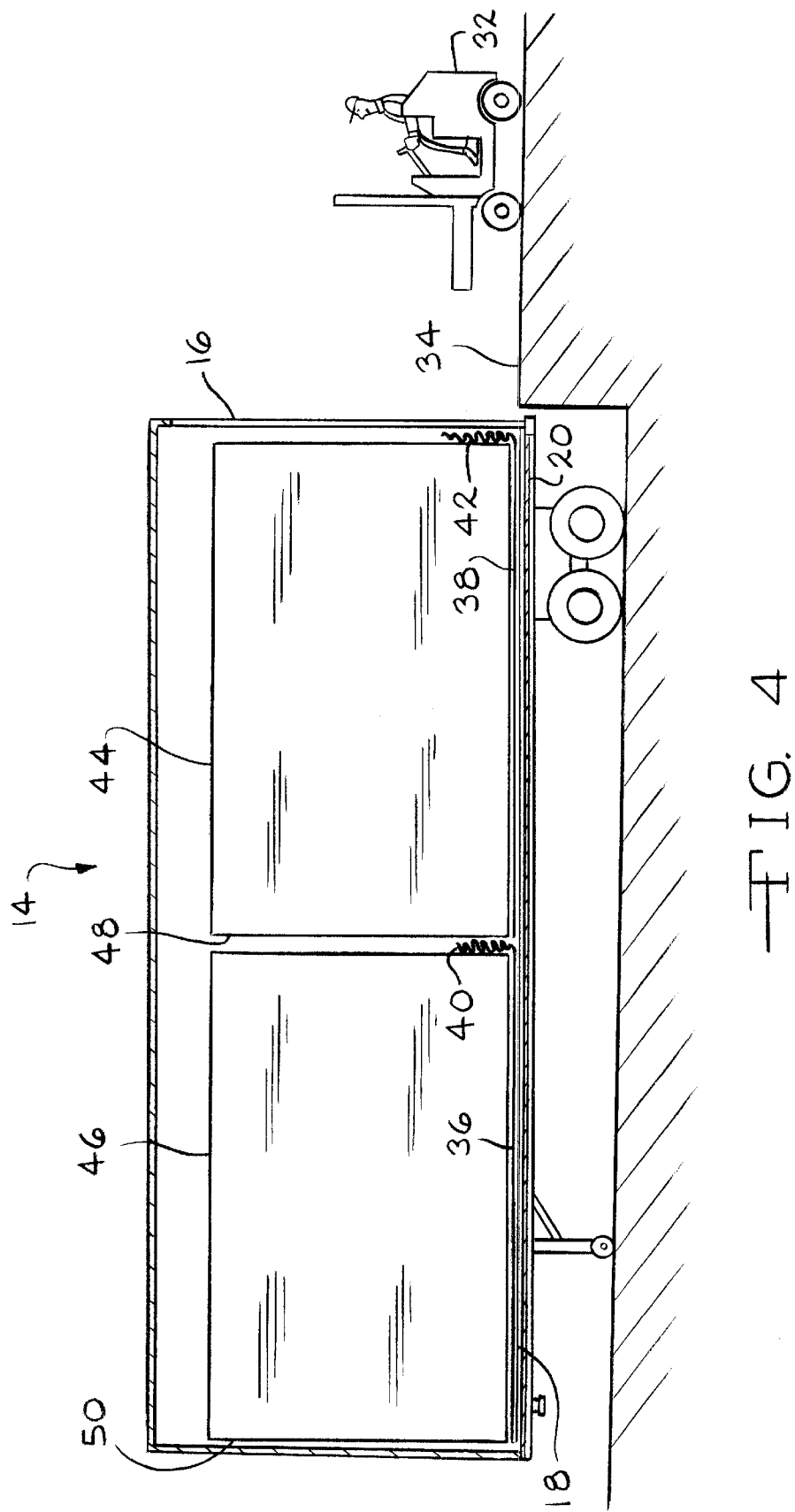
FIG. 4 is a schematic cross-sectional view in elevation of a truck having two pull sheets, each one adapted to remove half of the load in the truck.

In an alternative embodiment of the invention, the extension portion of the pull sheet 30 can be attached to a moving means relative to the truck 14 to unload the load from the truck 14. This moving means can be any suitable means for pulling the pull sheet 24 out of the truck 14. For example, the moving means can be the forklift truck 32, as shown in FIG. 4. By attaching the extension portion of the pull sheet 30 to the forklift truck 32 and moving the forklift truck 32 away from the truck 14, the load can be removed from the truck. Other moving means include a winch, a pulley system, and a motorized roller, all not shown.

The pull sheet 24 must have sufficient tensile strength to withstand pulling a load of packages 12 weighing at least 10,000 pounds from the truck 14. To accomplish this requirement, the tensile strength of the pull sheet 24 preferably is within the range of 150 to 550 pounds per inch width. It is to be understood that for heavier loads, the tensile strength must be increased, and for lighter loads a lower tensile strength can be used.

As shown in FIG. 4, the truck 14 can be backed up to a loading dock 34. The truck 14 is provided with a first pull sheet 36 having an extension portion 40 and a second pull sheet 38 having an extension portion 42. The second pull sheet 38 is adapted to be pulled from the truck 14 to remove a first portion 44 of the load from the truck 14 and the second pull sheet 38 is adapted to remove a second portion 46 of the load from the truck 14. The loads 44 and 46 have forward ends 48 and 50, respectively. The pull sheets 36 and 38 have the same general characteristics as the pull sheet 24. Both the first and second pull sheets 36 and 38 overlay the floor sheet 18. During shipping and storage of the load in the truck 14, it is advantageous to store the extension portions 40 and 42 of the first and second pull sheets 36 and 38 to the rearward of each half load so that the extension portions 40 and 42 are easily accessible for unloading the truck 14. It can be seen that the first portion 44 of the load can be removed from the truck 14 by pulling on the extension portion 42 of the second pull sheet 38. This is followed by removing the second portion 46 of the load by pulling on the extension portion 40 of the first pull sheet 36. While the use of two pull sheets 36 and 38 are shown in combination with a loading dock, it is to be understood that the use of the two pull sheets can be used for unloading at a site without a loading dock.

While the invention has been described thus far in terms of pulling the load from the truck 14 by pulling on the pull sheet 24 (or the pull sheets 36 and 38 shown in FIG. 4), in one embodiment of the invention the load is actually forced out the rear 16 of the truck by means of a rearwardly directed force applied to the forward end of the load. As described above, the load rests on the pull sheet 24 having a relatively low coefficient of friction on its bottom surface 26 and a relatively high coefficient of friction on its top surface 28. The pull sheet rests on the floor sheet 18, which has a top surface 22 with a relatively low coefficient of friction. The floor sheet 18 rests on the floor 20 of the truck. The rearwardly directed force on the forward end of the load can be applied by a mechanical pusher plate, not shown. Alternatively, the rearwardly directed force on the forward end of the load can be applied by a netting arrangement, similar to a cargo net, not shown, arranged around the load and attached to a tether or similar pulling member. The tether can be attached to a means for pulling, such as those means for pulling described above. In the case of the mechanical pusher plate, the plate can be mounted with a motorized apparatus, not shown, for movement in the rearward direction, or can be attached to a tether, also not shown, for pulling rearwardly. The rearwardly directed force on the forward end of the load causes the pull sheet and its accompanying load to be pulled or pushed out of the truck 14.

The principle and mode of operation of this invention have been described in its preferred embodiments. However, it should be noted that this invention can be practiced otherwise than as specifically illustrated and described without departing from its scope.

What is claimed is:

1. An apparatus for unloading a load from a container having a floor, comprising:
    a floor sheet placed on the floor of the container, the floor sheet having a top surface with a coefficient of static friction less than about 0.3;
    a first pull sheet placed on the top surface of the floor sheet, the first pull sheet having a bottom surface with a coefficient of static friction less than about 0.5;
    wherein the first pull sheet has a tensile strength sufficient to enable the first pull sheet to be pulled from the container while maintaining the load on the top surface of the first pull sheet to unload the load from the container; and
    a second pull sheet placed on the top surface of the floor sheet, the second pull sheet have a bottom surface with a coefficient of static friction less than about 0.5;
    wherein the second pull sheet has a tensile strength sufficient to enable the second pull sheet to be pulled from the container while maintaining the load on the top surface of the second pull sheet to unload the load from the container.

2. The apparatus of claim 1 wherein the top surface of the floor sheet has a coefficient of static friction less than about 0.15.

3. The apparatus of claim 1 wherein the bottom surface of the first and second pull sheets have a coefficient of static friction less than about 0.4.

4. The apparatus of claim 1 wherein the first and second pull sheets have a load portion and an extension portion, the load portion being adapted to receive the load and the extension portion being adapted to extend away from the load portion for pulling the pull sheet from the container.

5. The apparatus of claim 1 wherein the first and second pull sheets have a tensile strength within the range of from about 150 to 550 pounds per inch width.

6. The apparatus of claim 1 in which the first and second pull sheets have sufficient strength to pull a load of at least 10,000 pounds from the container.

7. The apparatus of claim 1 wherein the first and second pull sheets have a top surface with a coefficient of static friction greater than about 0.6.

8. The apparatus of claim 1 wherein the floor sheet is a monolayer of polyethylene.

9. The apparatus of claim 8 wherein the floor sheet is comprised of linear low density polyethylene and high density polyethylene.

10. The apparatus of claim 1 wherein the first and second pull sheets comprise a woven mat of polypropylene strips.

11. The apparatus of claim 10 wherein the woven mat has a bottom surface that is coated with polypropylene.

12. A method of unloading a load from a container having a floor, comprising:
    positioning a floor sheet on the floor of the container, the floor sheet having a top surface with a coefficient of static friction less than about 0.3;
    positioning a first pull sheet on the top surface of the floor sheet, the first pull sheet having a bottom surface with a coefficient of static friction less than about 0.5;
    placing a first portion of the load on a top surface of the first pull sheet;
    positioning a second pull sheet on the top surface of the floor sheet, the second pull sheet having a bottom surface with a coefficient of static friction less than about 0.5;
    placing a second portion of the load on a top surface of the second pull sheet;
    pulling the second pull sheet from the container while maintaining the load on the top surface of the second pull sheet to unload the load from the container; and
    pulling the first pull sheet from the container while maintaining the load on the top surface of the first pull sheet to unload the load from the container.

13. The method of claim 12 in which the first and second pull sheets have sufficient strength to pull a load of at least 10,000 pounds from the container.

14. The method of claim 12 wherein the first and second pull sheets comprise a woven mat of polypropylene strips.

15. The method of claim 12 wherein the first and second pull sheets have a load portion and an extension portion, the load portion being adapted to receive the load and the extension portion being adapted to extend away from the load portion for pulling the pull sheet from the container, and wherein the pulling step for the first and second pull sheet comprises extending the respective extension portion away from the load portion, and pulling the extension portion to unload the load from the container.

16. A method of unloading a load from a container having a floor, comprising:

positioning a floor sheet on the floor of the container, the floor sheet having a top surface with a coefficient of static friction less than about 0.3;

positioning a first pull sheet on the top surface of the floor sheet, the first pull sheet having a load portion and an extension portion, the load portion having a bottom surface with a coefficient of static friction less than about 0.5 and being adapted to receive the load, and the extension portion being adapted to extend away from the load portion for pulling the first pull sheet from the container;

placing a first portion of the load on a top surface of the first pull sheet;

positioning a second pull sheet on the top surface of the floor sheet, the second pull sheet having a load portion and an extension portion, the load portion having a bottom surface with a coefficient of static friction less than about 0.5 and being adapted to receive the load, and the extension portion being adapted to extend away from the load portion for pulling the second pull sheet from the container;

placing a second portion of the load on a top surface of the second pull sheet;

extending the extension portion of the second pull sheet;

pulling the second pull sheet from the container by pulling the extension portion relative to the container while maintaining the load on the top surface of the second pull sheet to unload the load from the container;

extending the extension portion of the first pull sheet; and pulling the first pull sheet from the container by pulling the extension portion relative to the container while maintaining the load on the top surface of the first pull sheet to unload the load from the container.

17. The method of claim 16 in which the pulling steps for the first and second pull sheet comprise attaching the extension portion to a moving means that pulls the pull sheet relative to the container to unload the load from the container.

18. The method of claim 16 in which the first and second pulling steps comprise fixing the extension portion to an immovable object, and moving the container to unload the load from the container.

* * * * *